United States Patent Office 2,973,894
Patented Mar. 7, 1961

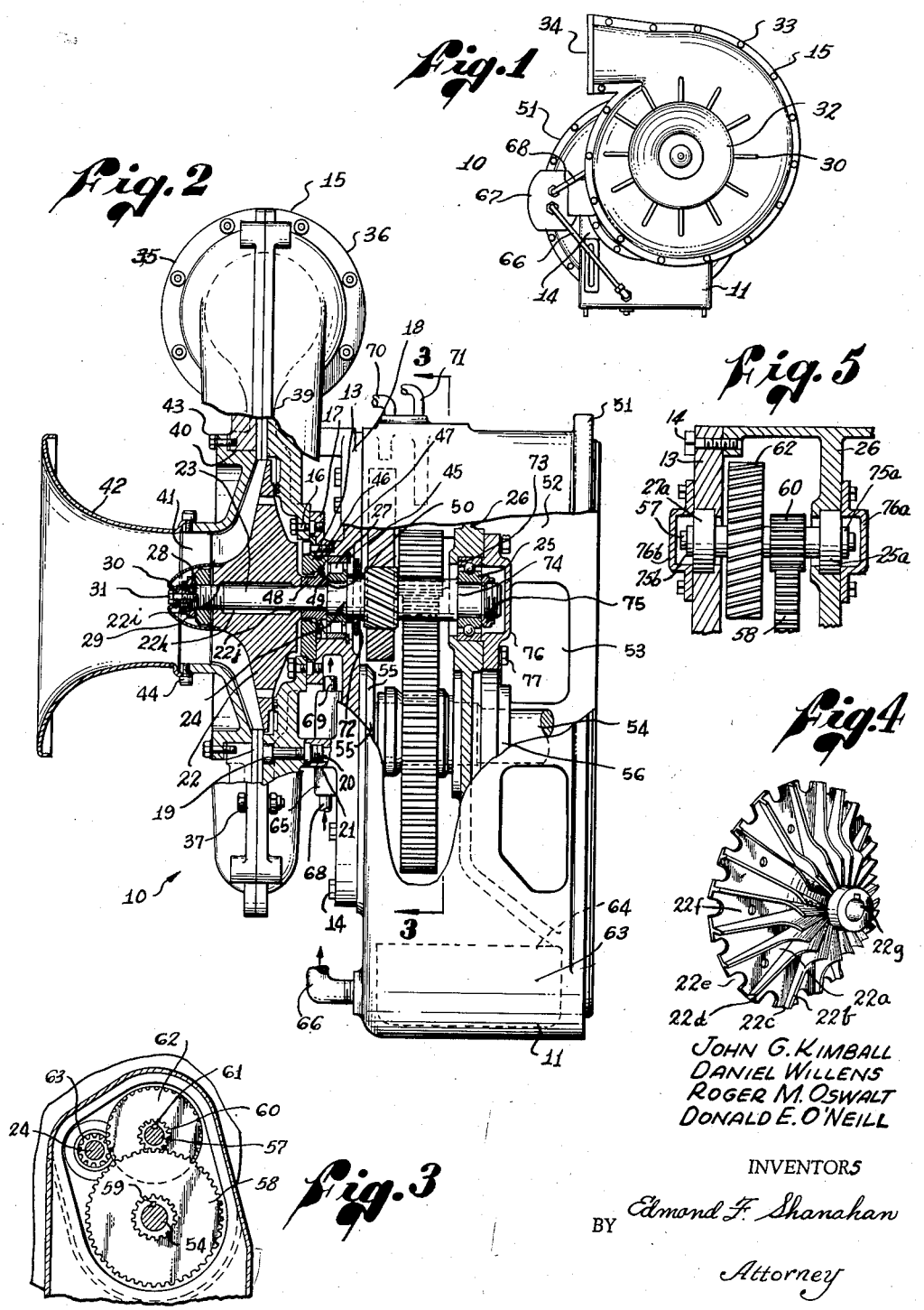

2,973,894

CENTRIFUGAL COMPRESSOR FOR STARTING JET ENGINES

John G. Kimball, Los Angeles, Daniel Willens, Culver City, Roger M. Oswalt, Los Angeles, and Donald E. O'Neill, Gardena, Calif., assignors to Turbo Research Corporation, a corporation of California Filed June 17, 1957, Ser. No. 666,027

3 Claims. (Cl. 230—127)

This invention relates generally to centrifugal compressors for ground servicing jet airplanes. Such compressors must be small enough to be readily portable in an airport service cart, but must at the same time have a capacity large enough to deliver at suitable pressure the one hundred or more pounds per minute of air required for starting most jet aircraft. More particularly, this invention relates to such a compressor which can be permanently mounted on a power source, such as a gasoline engine or electric motor, and disassembled to any desired stage of disassembly entirely from the front or impeller side.

The jet airplane engine, once started, diverts a large part of its energy to the compression of air to suitable combustion pressure, usually 40 to 80 pounds per square inch in its own compressor. However, starting the engine presents the problem of supplying a substantial quantity of air under combustion pressure for a short period of time, usually between about 15 seconds and about 1½ minutes, during the stage from standstill to operating speed. An independent compressor unit must be available to supply starting air, and since aircraft to be served by such a compressor may be located at various points on an airport field, it is generally required that the starting compressor be portable in a small truck or cart of the type used for transporting aircraft service equipment from one part of the field to another.

Centrifugal compressors are best suited to the purpose of delivering a moderate mass flow rate at a relatively high pressure from a relatively small compressor. Axial compressors are more expensive to build and for the same size produce less pressure rise, and reciprocating compressors would be much more massive for given capacity of output. Even the centrifugal compressor presents the designer with certain mutually contradictory requirements. On the one hand, the compressor must be built to be operated at very high speed, in the range of 37,000 revolutions per minute, in order to deliver a mass flow of air in the range of 150 pounds per minute at a desired output pressure of 3 or 4 atmospheres. On the other hand, the mass flow capacity and strength to withstand high speed of operation must be built into a small, portable machine weighing not more than a few hundred pounds. Moreover, it is an important requirement that the major high speed parts of the compressor be accessible for partial disassembly for periodic inspection, without unnecessarily expensive take-down of the engine and compressor unit. It is desirable for reasons of safety and maintenance to inspect the impeller after a certain number of hours of operation, and to inspect the gears and bearings much less frequently. In most centrifugal compressors, however, such an inspection of the impeller cannot be had without full disassembly of either the air conduit system or the driving gear assembly, or both.

Another important requirement of a lightweight portable compressor is that its structure be so designed as to make primary use of the driving engine for structural rigidity. It is usual in high speed compressor design to rely solely upon the compressor's own housing for rigidity. In the present design, maximum strength, consistent with portability, is required on account of the high speed of operation. These same requirements make it necessary that the compressor be balanced about a central axis to minimize stresses from dynamic loads.

It is a major object of the present invention to provide a centrifugal compressor with a gear housing which can be permanently mounted on the power supply means, and which simultaneously serves to enclose the couplings thereto.

It is another major object of the present invention to provide an integral assembly of compressor and driving gear system in which the compressor can be progressively disassembled from the front or impeller end. It is still another important object of the invention to provide an integral compressor and driving gear system in which the gear system is removable from the front of the gear housing by removal of the front panel thereof.

It is still another object of the invention to provide an impeller and gear assembly in which vibration is minimized by locating the highspeed impeller shaft in a plane which is intermediate to the planes of the other shafts of the gear system.

The foregoing and other objects are accomplished by means of a compressor and gear train assembly mounted in a compact housing which is recessed at the back, so that the periphery of the housing mates closely with the power supply to which the drive shaft of the gear train is coupled. The recessing also serves to provide an access space back of the rear panel of the gear housing by means of which access may be had to the rearward ends of the gear train shafts without demounting the gear train housing from the power supply.

The invention also employs a gear train with the shafts closely disposed for purposes of strength and with the front bearings mounted in a single removable front panel on the front of the gear housing. The entire compressor unit is cantilevered from the exterior of the front panel and is bolted thereto in a manner which is sufficiently rigid to prevent vibration, but it is at the same time lightweight and convenient to disassemble.

Finally, the entire device is made to disassemble in convenient units from the front. The assembly breaks away at various planes transverse to the impeller shaft rather than longitudinal therewith. Thus, it is only necessary to partially disassemble the compressor in order to inspect the impeller and the compressor interior.

The invention may be fully comprehended from the following description of one preferred specific embodiment, which is illustrated in the accompanying drawings in which:

Figure 1 is a front elevational view of the integral centrifugal compressor and drive gear system;

Figure 2 is a side elevation of the compressor and gear system, shown partly in vertical cross section;

Figure 3 is a vertical sectional view transverse to the impeller and gear shaft axes as seen in the direction of the arrows 3—3 in Figure 2;

Figure 4 is a perspective view of the impeller; and

Figure 5 is a fragmentary vertical sectional view taken in the direction of the arrows 5—5 in Figure 3.

Figures 1 and 2 reveal, in part, the front and side views of the compressor and driving gear system 10. A massive unitary casting 11 houses the gear train 12 and is covered at the front by a vertical panel 13, being bolted to the front of the housing 11 by means of a large number of peripheral bolts 14. Doweling is also used to insure precision of placement of the panel 13 on the housing 11.

A centrifugal compressor assembly 15 is hung from the front of the removable front panel 13 by a number of bolts 16 which fasten the assembly 15 to a circular flange 17 carried on a boss 18 projecting from the upper right part of the front panel 13. Attachment of the assembly 15 to the front panel 13 is braced against vibration by means of additional bolts 19 which connect the assembly 15 by threading into internally threaded holes 20 in projecting bosses 21 on the front of front panel 13.

The impeller, revealed in perspective and by itself in Figure 4, is seen in longitudinal section inside the compressor assembly 15 in Figure 2. The impeller 22 is carried on the forward projecting end 23 of a high speed impeller shaft, indicated generally by the numeral 24, and mounted in bearings 25 in the back wall 26 of the gear housing 12 and roller bearing 27 mounted in the boss 18 on the front panel 13. The forward end 23 of the impeller shaft 24 is threaded at 28 to receive a lock nut 29 which holds the impeller 22 firmly in place. An aerodynamic cap 30, seen in both Figures 1 and 2, is fastened to the end of the impeller shaft 24 by means of axial machine screw 31 to reduce the resistance to the flow of intake air.

Both the intake and discharge of the compressor 15 may be seen in Figure 1, in which the inlet bell mouth 32 is seen to be mounted axially in front of the impeller and the scroll 33 for collecting the compressed air and discharging it at 34 is seen to be comprised (see Figure 2) of front and rear scroll sections 35 and 36 bolted together as at 37 to form an annular collecting passage for air from the impeller 22. The back scroll section 36 is the part of the compressor assembly 15 which, as already mentioned, is bolted by bolts 16 and 17 to the removable front panel 13 of the gear housing 12. Thus, the interior surface of the back scroll 36 provides the back casing for the impeller 22 and the back wall of the annular diffusing passage, seen in dashed line at 39, around the periphery of the impeller 22.

The front scroll section 35 has an axial opening 40, which is preferably of larger diameter than the impeller 22. The opening 40 is covered except for intake 41 by a front fairing 42 which is bolted around its periphery to the front scroll section 35 by bolts 43 and carries the intake bell mouth 32, which is attached to it by radially disposed bolts 43.

As seen in Figure 4, and the longitudinal section of Figure 2, the impeller 22 has a substantially conical central body 22a from one face of which the impeller blades 22b project, being joined at their outer tips 22c by a disc-like flange 22d, which is partially cut away by notches 22e and holes 22f parallel with the axis of the impeller 22. Figure 2 reveals that the impeller 22 has an axial bore 22g which is partially relieved at 22h to leave a slight clearance between the body of the impeller and shaft 24, except for lands 22i and 22j near the front and back of the impeller 22. The impeller 22 is mounted by shrink-fitting or other suitable means to the shaft 24, and the clearance provided by the recessing of 22h makes it easier to force the impeller 22 onto the shaft 24 or to remove it therefrom. The roller bearing 27 is retained in position at the back by a snap ring 45 or other means and at the front by an outer seal ring 46 which carries an O-ring 47. A spacer 48 carrying a conical flange 49 is held firmly between the impeller 22 and a shoulder 50 on the part of the shaft 24 which is held in the lower bearing 27. Spacer 50 serves to raise the critical speed of the high speed assembly on the high speed shaft 24 and also to resist the leakage of air from the back of the impeller 22 into the gear housing 12, and also to prevent oil escaping from the gear box. The back wall 26 of the gear housing 12 is seen to be inwardly recessed from a vertical peripheral mounting flange 51 by means of which the entire compressor and drive gear system can be attached to the power source, preferably. The space thus provided between the rear wall 26 of the gear housing and the plane of the attachment flange 51 is provided with access openings 53.

The gear train 12 is driven by means of a drive shaft 54, which is journaled at the forward end in a bearing 55 in the front panel 13 and at the back at 56 in the back wall 26 of the gear housing 11. A flexible coupling, not shown, may be used to couple the backwardly projecting end of the drive shaft 54 to the crank shaft of a power supply engine in the space 53 provided behind the internally recessed back wall 26.

Although any suitable gear train may be provided between the drive shaft 54 and the high speed impeller shaft 24, the preferred form of the invention makes use of a single intermediate shaft 57, best seen in Figure 3. A large spur gear 58, keyed by key 59 to drive shaft 54, drives a small spur pinion 60 integral with intermediate shaft 57. Keyed on intermediate shaft 57 is an intermediate helical gear 62 which drives the helical pinion 63, which is an integral part of the high speed shaft 24.

Typical relative speeds of the three shafts 54, 57, and 24 may be illustrated by a numerical example based upon one embodiment of the invention, as used with a 300 horsepower internal combustion power source. A characteristic speed for the crank shaft of such power sources is 2500 revolutions per minute. Assuming such a speed for the drive shaft 54, a speed of 11,190 revolutions per minute may be conveniently imparted to the intermediate shaft 57 by means of spur gearing. However, in making the next step upward in revolutions per minute, from 11,190 r.p.m. for the intermediate shaft 57 to 36,975 r.p.m., or approximately 37,000 r.p.m., for the high speed shaft 24, it is very much preferred that helical gears be employed to insure smooth and quiet operation and to balance the thrust created by the impeller 22. In one actual design, the above-described speed increase was achieved by the following arrangement of gear teeth:

|  | Teeth |
|---|---|
| Spur drive gear 58 | 94 |
| Intermediate spur pinion 60 | 21 |
| Intermediate helical gear 62 | 76 |
| High speed helical gear 63 | 23 |

The oil circulation system for the gears is entirely enclosed to prevent any foreign matter from entering the circulation system or the gear housing 11. The lower part of the gear housing 11 provides an oil reservoir indicated by the numeral 63, the upper surface of the oil being indicated by the dashed line 64. While the compressor is in operation, a pump 65, seen in the side elevational view of Figure 2, is driven by the forward end of the drive shaft 54, where it projects forwardly through front panel 13. Oil passes from the reservoir 63 through line 66 (see Figures 1 and 2) to an oil cooler 67, and then through line 68 to the pump 65. High pressure oil leaves pump 65 by way of line 69 through an oil filter with integral by-pass valve and is distributed to the gears by branch lines, such as lines 70 and 71, seen in Figure 2, which spray oil on the upper surfaces of the intermediate and drive gears, respectively. A slinger ring 72 is carried on the high speed shaft 24 just behind the roller bearing 27 and serves to prevent excessive quantities of oil from impinging on the roller bearing 27.

In Figure 5 the bearings 25a and 27a on the intermediate speed shaft 57 are shown in section, together with the lock nut 75a and cap 76a at bearing 25a, and the lock nut 75b and cap 76b at bearing 27a. It will be understood that the bearings for the intermediate shaft 57 and the drive shaft 54 may be like those of the high speed shaft 24. Preferably, the bearings in the front panel 13 are roller bearings so as to facilitate disassembly from the forward end of the compressor and gear system. In each case, the back bearings are preferably ball bearings, such as bearing 25 on the rear end of the high speed shaft 24, to hold the shaft in the desired longitudinal position. It is seen that the bearing 25 is received on an annular shoulder 73 which engages the forward edge of the outer race of the bearing 25. The high speed shaft 24 is held firmly in position on the bearing 25 by an annular shoulder 74 on the shaft which engages the forward face of the inner race, and a lock nut 75 which is received on the threaded rear end of the shaft 24 and engages the back face of the inner race of the bearing 25. The bearing 25 is held in place in its recess in the back panel 26 against the forward annular shoulder 73 by means of a bearing cap 76 which is bolted to the back surface of the back panel 26 by bolts 77 and holds the bearing 24 in place by an annular shoulder 78 which presses against the back face of the outer race of ball bearing 25.

It will be seen from the foregoing description of the illustrated specific embodiment, that the invention provides a fully enclosed and almost completely sealed integral assembly of gear system and compressor. The system is remarkably free of any openings through which foreign matter might gain entrance and cause damage to the high speed parts. Also, the system is so constructed and balanced that there are substantially no adjustments to be made by personnel in the field.

After a substantial period of operation, the compressor and gear assembly may be dismantled for inspection and overhaul. The bearings are usually the first component to exhibit sufficient wear to require replacement. Also, in comparison with other parts, the bearings are relatively inexpensive. It is, therefore, not of great consequence if the bearings or some of them are damaged or destroyed in the process of disassembling the compressor and gear system. It is a feature of the present invention that disassembly can be quickly and efficiently achieved by the sacrifice of the time of takedown to necessitate replacement anyway.

Disassembly of the compressor may best be accomplished from the front end by removing the intake bell mouth 32 and the front fairing 42. The streamlined cap 31 may then be removed, permitting removal of the impeller retaining nut 28 and removal of the impeller 22.

The diffuser passage 39 around the periphery of the impeller 22 may be inspected by next removing the front scroll section 35 only.

Full take-down may be accomplished by then continuing with the unbolting of the back scroll 36 from the flange 17 and the bracing bosses 19. The mechanic then inserts an arm through the access holes 53 at the back of the gear housing 11 and removes the bolts 77 and the bearing cap 76. The lock nut 75 may then be unthreaded from the rear end of the high speed shaft 24. When this has been done, the nuts 14 disposed about the periphery of the front panel 13 may be removed. The panel 13 is then carefully withdrawn in a forward direction, preferably by means of a jack engaging the flange 51 at the back of the gear housing 11. As the panel 13 moves forward and away from the gear housing 11 it carries with it the outer race of the roller bearing 27 and, ordinarily, the outer races of forward bearings on the intermediate shaft 57 and the drive shaft 54.

When the front panel 13 has been removed, the three shafts 24, 57, and 54 are left with their forward ends unsupported. The high speed shaft 24 may then be pulled directly forward, usually destroying the back ball bearing 25, since the balls are likely to score the races before the shaft 24 can be extracted from the inner race of the bearing 25. As previously pointed out, this is not a matter for great concern, since the basic reason for disassembly is to replace the bearings when the gear system is taken down.

After removal of the high speed shaft, the intermediate shaft 57 and its gear 62 are forwardly withdrawn through the front opening of the gear housing 11 uncovered by the removal of the front panel 13. This is followed by the forward removal of the drive shaft 54 and the drive gear 58.

The above-described disassembly may be carried out entirely from the front of the compressor and gear assembly, and may, if circumstances require it, be carried out even in the mounted position with the gear housing 11 retained on the power source and the shafts 24, 57, and 54 disposed in a horizontal position. Moreover, it is not necessary to disassemble to a greater depth than may be desired. If only an inspection of the impeller and of the air passages is required, the removal of the front fairing 42 and the front scroll section 35 permits inspection of substantially all of the impeller and the air passage surfaces. The back fairing walls of the back scroll section 36 behind the impeller 22 can be observed to a substantial degree without the removal of the impeller 22 by looking through the notches 22e and the holes 22f.

It will be understood that the above description is not intended to limit the scope of the invention, but is merely illustrative and sets forth a specific embodiment in detail in order to show a preferred form in which the invention may actually be practical. It is not our intention, however, to be limited by the details of the described embodiment herein, but only by the terms of the combination described in the appendant claims.

We claim:

1. An integral centrifugal compressor and drive gear system, which includes: a gear housing with an inwardly recessed rear wall; a unitary front panel on said housing, said front panel being disposed in substantially a single plane and removable; flange means to the rear of said housing for mounting said housing on a power source; a drive shaft mounted in bearings in said front panel and said recessed rear wall, said shaft having an extension to the rear of said rear wall for coupling to a power source near the plane of said flange; a high speed shaft mounted in bearings in said front panel and said rear wall, said high speed shaft having an extension to the front of said front panel for mounting an impeller; a gear train means between said drive shaft and said high speed shaft for driving said high speed shaft at a substantially higher rate of revolutions than said drive shaft and including at least one bearing support in said front panel; a centrifugal impeller mounted on said forward extension of said high speed shaft, a back scroll section mounted on said front panel and shrouding the back of said impeller; a front scroll section mating with said back scroll section to provide a passage for collecting the peripheral discharge of said impeller and discharging it in a substantially tangential stream; and intake and shroud means mounted on said front scroll section for funneling an axial stream of air to said impeller and shrouding the front of said vane.

2. An integral centrifugal compressor and drive gear system which includes: a gear housing which includes an inwardly recessed rear wall, and side walls enclosing said recess rear wall with lateral access openings; a front panel on said housing, said front panel being removable and extending laterally to permit the forward removal from said gear housing of the drive shaft gearing, high speed shaft gearing and gear train gearing recited hereinafter; a drive shaft and gearing mounted in bearings in said front panel and said recessed rear wall, said shaft having an extension to the rear of said rear wall for coupling to a power source; a high speed shaft and gearing mounted in bearings in said front panel and said rear wall, said shaft having an extension to the front of said front panel for mounting an impeller; a gear train shaft means and gearing mounted in bearings in said front panel and said rear wall; a centrifugal impeller mounted on said forward extension of said high speed shaft; front bearing retainer means fastened to the front surface of said front panel for retaining the front bearing of said high speed shaft in position in said front panel; means at the rear end of said high speed shaft for retaining it in position, said means being removable to permit disassembly by access to said recess rear wall through said lateral access openings; a back scroll section mounted on said front panel and shrouding the back of said impeller; and a front scroll section mating with said back scroll section to provide a passage for collecting the peripheral discharge of said impeller.

3. A portable centrifugal compressor which includes: a gear housing which includes an inwardly recessed rear wall and an oil reservoir in the base; a front panel on said housing above the level of said oil reservoir, said front panel being removable; flange means to the rear of said housing for mounting said housing on a power source; a drive shaft mounted in bearings in said front panel and said recessed rear wall, said shaft having an extension to the rear of said rear wall for coupling to a power source near the plane of said flange; a high speed shaft mounted in bearings in said front panel and said rear wall, and having an extension to the front of said front panel for mounting an impeller; a gear train means between said drive shaft and said high speed shaft for driving said high speed shaft at a substantially higher revolution rate than said drive shaft and including at least one bearing support in said panel; a centrifugal impeller mounted on said forward extension of said high speed shaft; a back scroll section mounted on said front panel and shrouding the back of said impeller; a front scroll section mating with said back scroll section to provide a passage for collecting the peripheral discharge of said impeller and discharging it in a substantially tangential stream; intake and shroud means mounted on said front scroll section for funneling an axial stream of air to said impeller and shrouding the front of said vanes; an oil cooling heat exchanger means mounted on said housing; and oil pump means for said oil reservoir and cooler mounted on said front panel and driven by one of the shafts having bearings therein, said oil pump being removable with said front panel.

References Cited in the file of this patent

UNITED STATES PATENTS

| | | |
|---|---|---|
| 349,491 | Garfield | Sept. 21, 1886 |
| 1,670,065 | Eisenwinter | May 15, 1928 |
| 1,998,778 | Gregg | Apr. 23, 1935 |
| 2,016,846 | Waseige | Oct. 8, 1935 |
| 2,207,575 | Boyles et al. | July 9, 1940 |
| 2,274,763 | Yates | Mar. 3, 1942 |
| 2,623,365 | Daniel | Dec. 30, 1952 |
| 2,646,210 | Kohlman et al. | July 21, 1953 |
| 2,695,131 | Price | Nov. 23, 1954 |
| 2,804,826 | Cilker | Sept. 3, 1957 |

FOREIGN PATENTS

| | | |
|---|---|---|
| 1,624 | Great Britain | of 1884 |
| 484,954 | France | Oct. 31, 1917 |
| 640,762 | France | Apr. 3, 1928 |